United States Patent
Singh et al.

(10) Patent No.: US 12,087,979 B2
(45) Date of Patent: Sep. 10, 2024

(54) SYSTEM AND METHOD FOR PRODUCING POWER AND/OR CHEMICALS FROM COAL

(71) Applicants: China Energy Investment Corporation Limited, Beijing (CN); National Institute of Clean-and-Low-Carbon Energy, Beijing (CN)

(72) Inventors: Surinder Singh, Fremont, CA (US); Anthony Ku, Fremont, CA (US); John Lemmon, Arvada, CO (US); Wayne Qiang Xu, Guangdong (CN)

(73) Assignees: CHINA ENERGY INVESTMENT CORPORATION LIMITED, Beijing (CN); NATIONAL INSTITUTE OF CLEAN-AND-LOW-CARBON ENERGY, Beijing (CN)

( * ) Notice: Subject to any disclaimer, the term of this patent is extended or adjusted under 35 U.S.C. 154(b) by 347 days.

(21) Appl. No.: 17/327,108

(22) Filed: May 21, 2021

(65) Prior Publication Data
US 2022/0376278 A1    Nov. 24, 2022

(51) Int. Cl.
| | |
|---|---|
| H01M 8/04089 | (2016.01) |
| H01M 8/06 | (2016.01) |
| H01M 8/0612 | (2016.01) |
| H01M 8/12 | (2016.01) |
| H01M 4/90 | (2006.01) |

(52) U.S. Cl.
CPC ......... H01M 8/04089 (2013.01); H01M 8/06 (2013.01); H01M 8/0618 (2013.01);
(Continued)

(58) Field of Classification Search
CPC .. H01M 8/04089; H01M 8/06; H01M 8/0606; H01M 8/0618; H01M 4/9025;
(Continued)

(56) References Cited

U.S. PATENT DOCUMENTS

| | | | |
|---|---|---|---|
| 4,341,069 A | * | 7/1982 | Bell .......................... F02C 3/20 518/703 |
| 5,955,039 A | | 9/1999 | Dowdy |

(Continued)

OTHER PUBLICATIONS

Arun K.S. Iyengar et al., Energy Sector Planning and Analysis (ESPA) for the United States Department of Energy (DOE), National Energy Technology Laboratory (NETL), Techno-Economic Analysis of Integrated Gasification Fuel Cell Systems Created by Energy Sector Planning and Analysis for SEAP & OPPB, Nov. 24, 2014.

*Primary Examiner* — Jeremiah R Smith
(74) *Attorney, Agent, or Firm* — Calfee, Halter & Griswold LLP (57) ABSTRACT

A system and a method are provided for producing electricity and/or chemicals. The system includes a gasifier, a controller, a solid oxide fuel cell (SOFC) power unit, and a chemical synthesis unit. The gasifier converts a fossil fuel, oxygen, and water into a syngas comprising hydrogen and carbon monoxide. The controller is used to control distribution of the hydrogen into a first portion and a second portion. The solid oxide fuel cell (SOFC) power unit receives the first portion of hydrogen and compressed air or oxygen, and generates electricity using the first portion of hydrogen. The chemical synthesis unit receives the second portion of hydrogen. The second portion of hydrogen is used for chemical synthesis.

8 Claims, 9 Drawing Sheets

(52) U.S. Cl.
CPC ............ *H01M 8/12* (2013.01); *H01M 4/9025* (2013.01); *H01M 4/9033* (2013.01); *H01M 4/905* (2013.01); *H01M 2008/1293* (2013.01)

(58) Field of Classification Search
CPC ...... H01M 4/9033; H01M 4/905; H01M 8/12; H01M 2008/1293
See application file for complete search history.

(56) References Cited

U.S. PATENT DOCUMENTS

| | | | |
|---|---|---|---|
| 7,300,642 B1 | 11/2007 | Pedersen et al. | |
| 8,349,504 B1* | 1/2013 | Radovich | C10J 3/721 |
| | | | 429/426 |
| 2002/0174659 A1* | 11/2002 | Viteri | H01M 8/0662 |
| | | | 60/39.12 |
| 2004/0251241 A1* | 12/2004 | Blutke | C10J 3/723 |
| | | | 48/197 R |
| 2006/0003207 A1* | 1/2006 | Balan | H01M 8/0643 |
| | | | 429/465 |
| 2010/0129691 A1* | 5/2010 | Dooher | C01B 3/34 |
| | | | 422/600 |
| 2015/0288009 A1* | 10/2015 | Manabe | F02C 3/04 |
| | | | 429/446 |
| 2016/0351930 A1* | 12/2016 | Jahnke | C25B 1/04 |
| 2020/0048086 A1* | 2/2020 | Moore | G06Q 10/06 |
| 2020/0313207 A1* | 10/2020 | Milcarek | H01M 8/04022 |
| 2023/0411648 A1* | 12/2023 | Hisatome | H01M 8/04932 |

\* cited by examiner

SYSTEM AND METHOD FOR PRODUCING POWER AND/OR CHEMICALS FROM COAL

PRIORITY CLAIM AND CROSS-REFERENCE

None.

FIELD OF THE INVENTION

The disclosure relates to chemical and energy production generally. More particularly, the disclosed subject matter relates to a system and a method for producing electrical energy and/or chemicals using a fossil fuel such as coal.

BACKGROUND

A fossil fuel such as coal, oil, and natural gas can be used to generate electricity in a fossil fuel fired power plant. The chemical energy stored in such a fossil fuel is converted into thermal energy, mechanical energy, and then electrical energy. For example, the fossil fuel is burned in air or oxygen to create thermal energy, which is used to boil water into steam. The steam is used to turn turbines and generate electricity.

Coal gasification is a process of burning coal to produce syngas. Large-scale coal gasification installations are used for electricity generation.

SUMMARY OF THE INVENTION

The present disclosure provides a system and a method for producing electricity and/or producing chemicals using a fossil fuel such as coal.

In accordance with some embodiments, such a system comprises a gasifier, a controller, a solid oxide fuel cell (SOFC) power unit, and a chemical synthesis unit. The gasifier is configured to convert a fossil fuel, oxygen, and water into a syngas comprising hydrogen and carbon monoxide. The controller is configured to control distribution of the hydrogen into a first portion and a second portion. The solid oxide fuel cell (SOFC) power unit is configured to receive the first portion of hydrogen and compressed air or oxygen, and generate electricity using the first portion of hydrogen. The chemical synthesis unit is configured to receive the second portion of hydrogen and perform a chemical synthesis using the second portion of hydrogen.

In some embodiments, the fossil fuel is coal. In some embodiments, the system further comprises an air separation unit (ASU) configured to separate oxygen and nitrogen from air, provide the oxygen into the gasifier, and provide the nitrogen to the chemical synthesis unit. The chemical synthesis unit is configured to produce ammonia using hydrogen and nitrogen. In some embodiments, the nitrogen and hydrogen can be captured separately as separate products in a compressed or liquid form.

In some embodiments, the system further comprises a cleanup apparatus, which is fluidly coupled to the gasifier, and is configured to remove sulfur and other contaminants in the syngas from the gasifier. The system may further comprise a water gas shift (WGS) reactor configured to convert some or all of the carbon monoxide in the syngas with water or steam into carbon dioxide so as to increase the content of the hydrogen in the syngas. Thus the ratio of hydrogen gas to carbon dioxide increases. The system may further comprise a separator fluidly coupled to the WGS reactor. The separator is configured to remove carbon dioxide in the syngas for sequestration.

In some embodiments, the system also comprises a combustor coupled to the SOFC power unit. The combustor is configured to burn off a syngas residue from the SOFC power unit. The system may also comprise a heat recovery steam generator (HRSG), which is configured to use heat recovered from the gasifier, the SOFC power unit, the combustor, and other units.

In some embodiments, the controller is configured to adjust a ratio of the first portion to the second portion of hydrogen. The controller may comprise one or more processor and at least one tangible, non-transitory machine readable medium encoded with one or more programs configured to adjust the ratio of the first portion to the second portion of hydrogen. In some embodiments, the controller is configured to adjust the ratio of the first portion to the second portion of hydrogen based on a grid baseload, a percent load of the SOFC power unit, and/or a pre-determined minimum amount of the second portion of hydrogen for keeping the chemical synthesis unit running. For example, in some embodiments, the ratio of the first portion to the second portion of hydrogen is controlled based on a grid baseload and a percent load of the SOFC power unit. In some embodiments, the ratio of the first portion to the second portion of hydrogen is controlled based on a grid baseload and a percent load of the SOFC power unit, while at least a pre-determined minimum amount of the second portion of hydrogen is distributed for keeping the chemical synthesis unit running continuously.

In another aspect, the present disclosure provides a method. Such a method comprises steps of: converting a fossil fuel, oxygen, and water into a syngas comprising hydrogen and carbon monoxide in a gasifier, distributing the hydrogen in the syngas into a first portion and a second portion using a controller, generating electricity using the first portion of hydrogen and compressed air or oxygen in the solid oxide fuel cell (SOFC) power unit, and performing chemical synthesis using the second portion of hydrogen in a chemical synthesis unit.

In some embodiments, the fossil fuel is coal. Ammonia is produced in the chemical synthesis unit. Oxygen and nitrogen can be separated from air in an air separation unit (ASU), while the oxygen is provided into the gasifier, and the nitrogen is provided to the chemical synthesis unit. In some embodiments, the nitrogen and hydrogen can be captured separately as separate products in a compressed or liquid form.

The method may also further comprise other steps. For example, contaminants including sulfur in the syngas from the gasifier are removed in a cleanup apparatus fluidly coupled to the gasifier. Some or all of the carbon monoxide in the syngas may react with water and is converted into carbon dioxide in a water gas shift (WGS) reactor so as to increase the content of the hydrogen or the ratio of hydrogen to carbon dioxide in the syngas. Carbon dioxide in the syngas can be removed in a separator. The removed carbon dioxide is for sequestration.

In some embodiments, the ratio of the first portion to the second portion of hydrogen is controlled by controller. The controller comprises one or more processor and at least one tangible, non-transitory machine readable medium encoded with one or more programs configured to perform the function, for example, adjusting the ratio of the first portion to the second portion of hydrogen. In some embodiments, the ratio of the first portion to the second portion of hydrogen is adjusted based on a grid baseload and a percent load of the SOFC power unit at a time. For example, a percentage of the first portion of hydrogen is a product of the grid baseload and the percent load of the SOFC power unit. The remainder is a percentage of the second portion of hydrogen among the first and the second portions of hydrogen.

In some embodiments, at least a pre-determined minimum amount of the second portion of hydrogen is maintained for keeping the chemical synthesis unit running. Above such a pre-determined amount, the percentage of the first portion of hydrogen is the product of the grid baseload and the percent load of the SOFC power unit.

In some embodiments, the controller is configured to provide the signal with instructions to one or more valves for controlling the hydrogen ratio. The controlling process may be performed manually or automatically. For the first portion of hydrogen for power generation, it can be a mixture containing carbon monoxide (CO). In addition to hydrogen, CO can be used as a starting material in solid oxide fuel cells. Or a small amount of CO can be tolerated. For the second portion of hydrogen for chemical synthesis, an additional purification process may be used to remove any carbon monoxide or carbon dioxide residue and provide hydrogen having high purity into the chemical synthesis unit.

In some embodiments, the method further comprises burning off a syngas residue venting from the SOFC power unit in a combustor. Heat from the gasifier, the SOFC power unit, the combustor, and other apparatus can be recovered, and then used in one heat recovery steam generator (HRSG) for generating steam.

The system, the controller, and the method provided in the present disclosure offer many advantages. For example, the system provides capabilities in producing both electrical power and/or chemicals, with flexibility in controlling the amount and the ratio based on the needs.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

In the present disclosure the singular forms "a," "an," and "the" include the plural reference, and reference to a particular numerical value includes at least that particular value, unless the context clearly indicates otherwise. When values are expressed as approximations, by use of the antecedent "about," it will be understood that the particular value forms another embodiment. As used herein, "about X" (where X is a numerical value) preferably refers to ±10% of the recited value, inclusive. For example, the phrase "about 8" preferably refers to a value of 7.2 to 8.8, inclusive. Where present, all ranges are inclusive and combinable. For example, when a range of "1 to 5" is recited, the recited range should be construed as including ranges "1 to 4", "1 to 3", "1-2", "1-2 & 4-5", "1-3 & 5", "2-5", and the like. In addition, when a list of alternatives is positively provided, such listing can be interpreted to mean that any of the alternatives may be excluded, e.g., by a negative limitation in the claims. For example, when a range of "1 to 5" is recited, the recited range may be construed as including situations whereby any of 1, 2, 3, 4, or 5 are negatively excluded; thus, a recitation of "1 to 5" may be construed as "1 and 3-5, but not 2", or simply "wherein 2 is not included." It is intended that any component, element, attribute, or step that is positively recited herein may be explicitly excluded in the claims, whether such components, elements, attributes, or steps are listed as alternatives or whether they are recited in isolation.

The present disclosure provides a system and a method for producing electricity and/or producing chemicals using a fossil fuel such as coal. The system and the method can be used to produce electricity and chemicals simultaneously, with an adjustable ratio.

In the present disclosure, the integrated gasification fuel cell (IGFC) technology, including solid oxide fuel cell (SOFC), is used to produce electricity from a fossil fuel such as coal with high efficiency and high capability to capture carbon dioxide ($CO_2$). Gasification of a fossil fuel such as coal provides syngas comprising hydrogen ($H_2$). The hydrogen can be used as a fuel for solid oxide fuel cell for producing electricity. In addition, the IGFC technology is used in combination with chemical production with high flexibility. Additional hydrogen can be used for chemical production. The chemical production may include hydrogen production, and/or hydrogen for synthesis of other chemicals such as ammonia. Carbon dioxide is captured and sequestrated in the system and method. The ratio of power production and chemical production can be adjusted based on the supply and demand, or technical requirements. For example, when the demand for power is low, the capability for chemical production may be increased.

As used herein, when a unit or component is described as being "connected to," "coupled to," "coupled with" or "in contact with" another unit or component, it can be directly connected to, directly coupled with, in direct contact with, or intervening units or components may be connected, coupled or in contact with the particular unit or component. When a unit or component is referred to as being "directly connected to," "directly coupled to," "directly coupled with," or "directly in contact with" another unit or component, there are no intervening unit or component.

As used herein, the terms "fluidly coupled to" or "fluidly coupled with" will be understood that the components or units are connected with pipes or lines and configured to have gas or liquid flow through the components. As used herein, the terms "thermally coupled to" or "thermally coupled with" will be understood that the components are coupled together directly or through an intervening component so that heat can be transferred among the components, and the components may be in direct contacted with each other or the intervening component contact the components.

As used herein, the terms "electronically connected" or "electrically connected" will be understood to encompass different connections or coupling between or among the components or units so as to conduct electricity or transmit signals for communication. Such a connection or coupling can be through wire, wireless, or cloud-based modes.

In the present disclosure, unless expressly indicated otherwise, the units and components in the system described herein are fluidly coupled with each other. The units and components are fluidly coupled together for providing gas or liquid chemicals. The units and components related to heat recovery are also thermally coupled together. The controller described herein may be electrically or electronically connected with other unit or components for performing its controlling functions. For brevity, the descriptions of the connections for the units and components are not be repeated for every unit or component.

Figure 1:
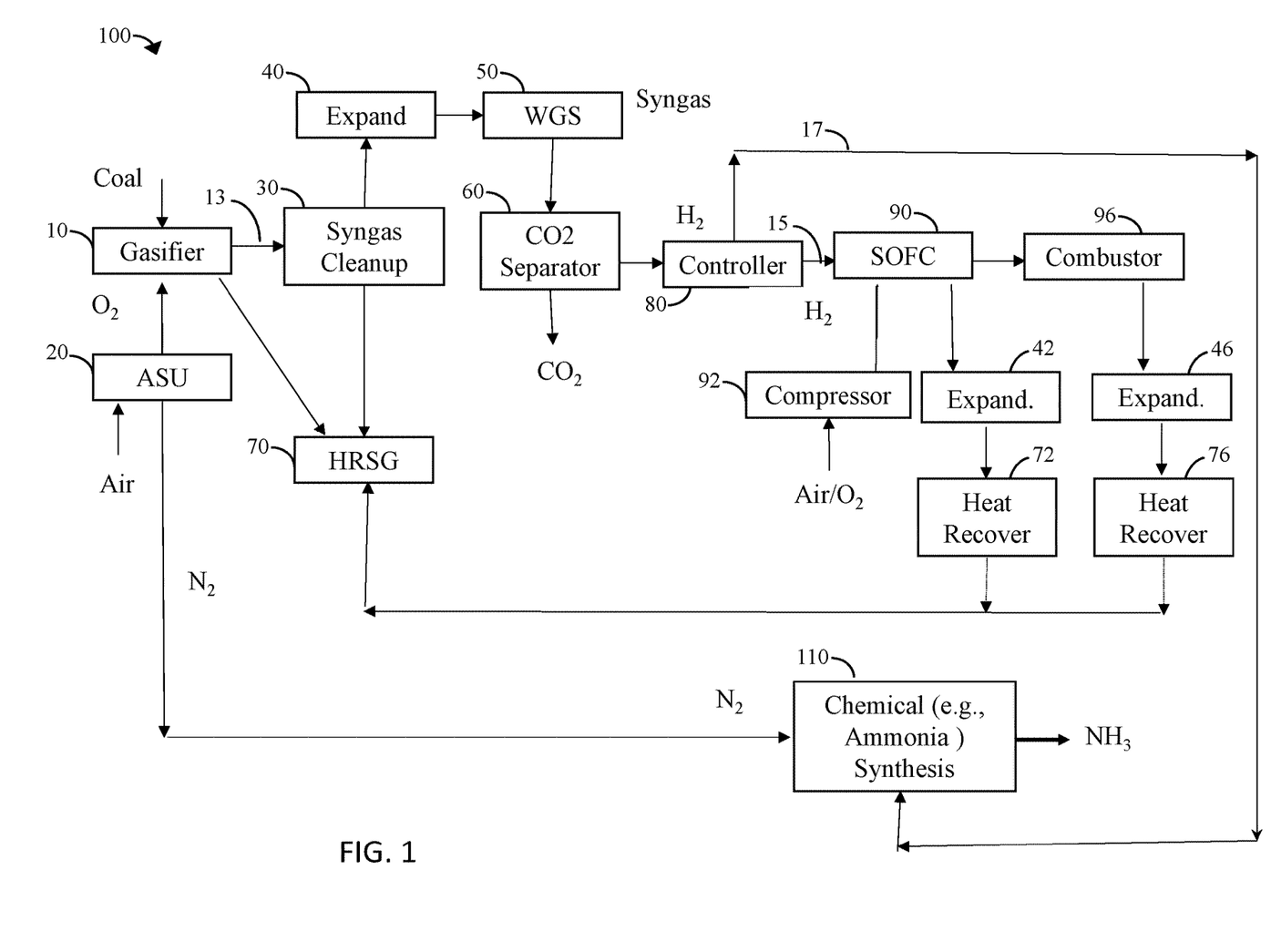
FIG. 1 is a block diagram illustrating an exemplary system for producing electricity and/or chemicals in accordance with some embodiments.
Figure 2:
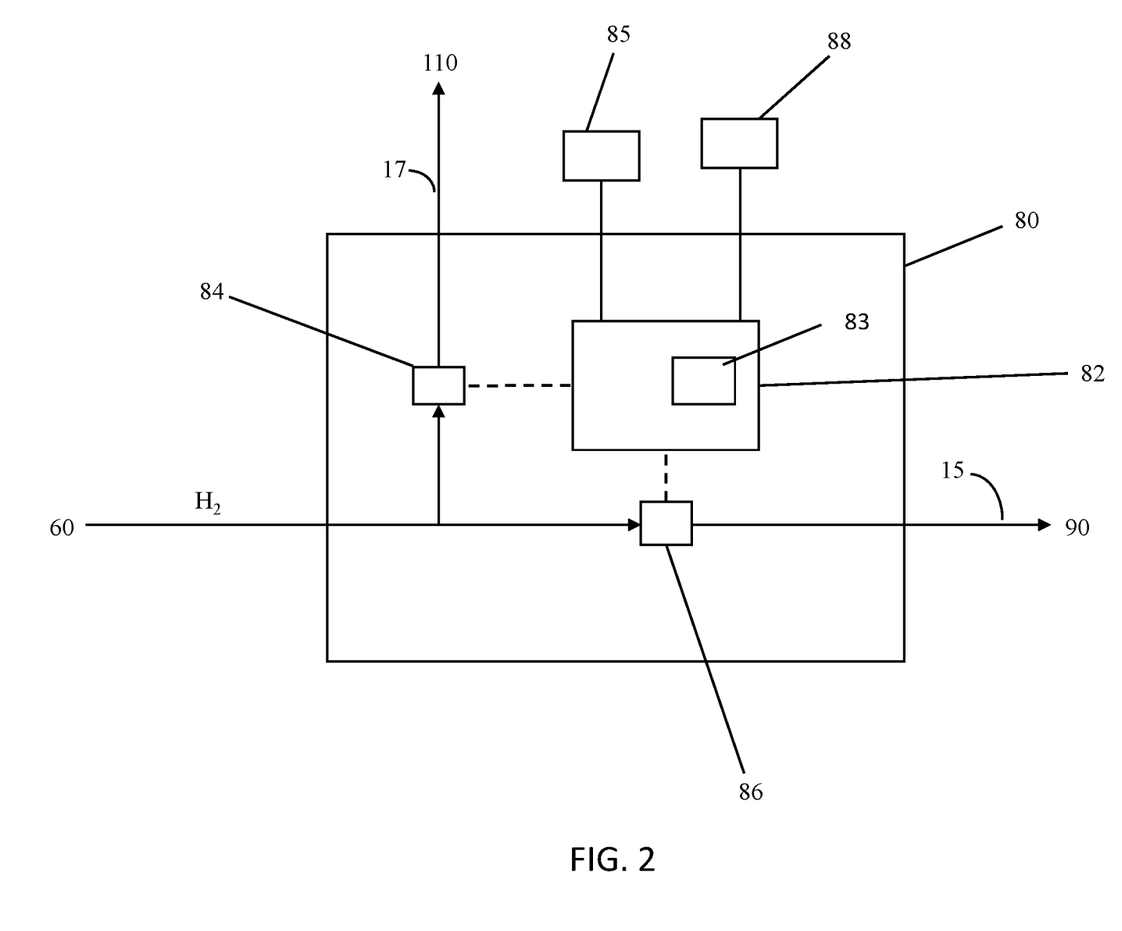
FIG. 2 is a block diagram illustrating an exemplary controller comprising one or more processor and at least one tangible, non-transitory machine readable medium encoded with one or more programs, for controlling hydrogen supply for electricity and/or chemical production in accordance with some embodiments.
Figure 3A:
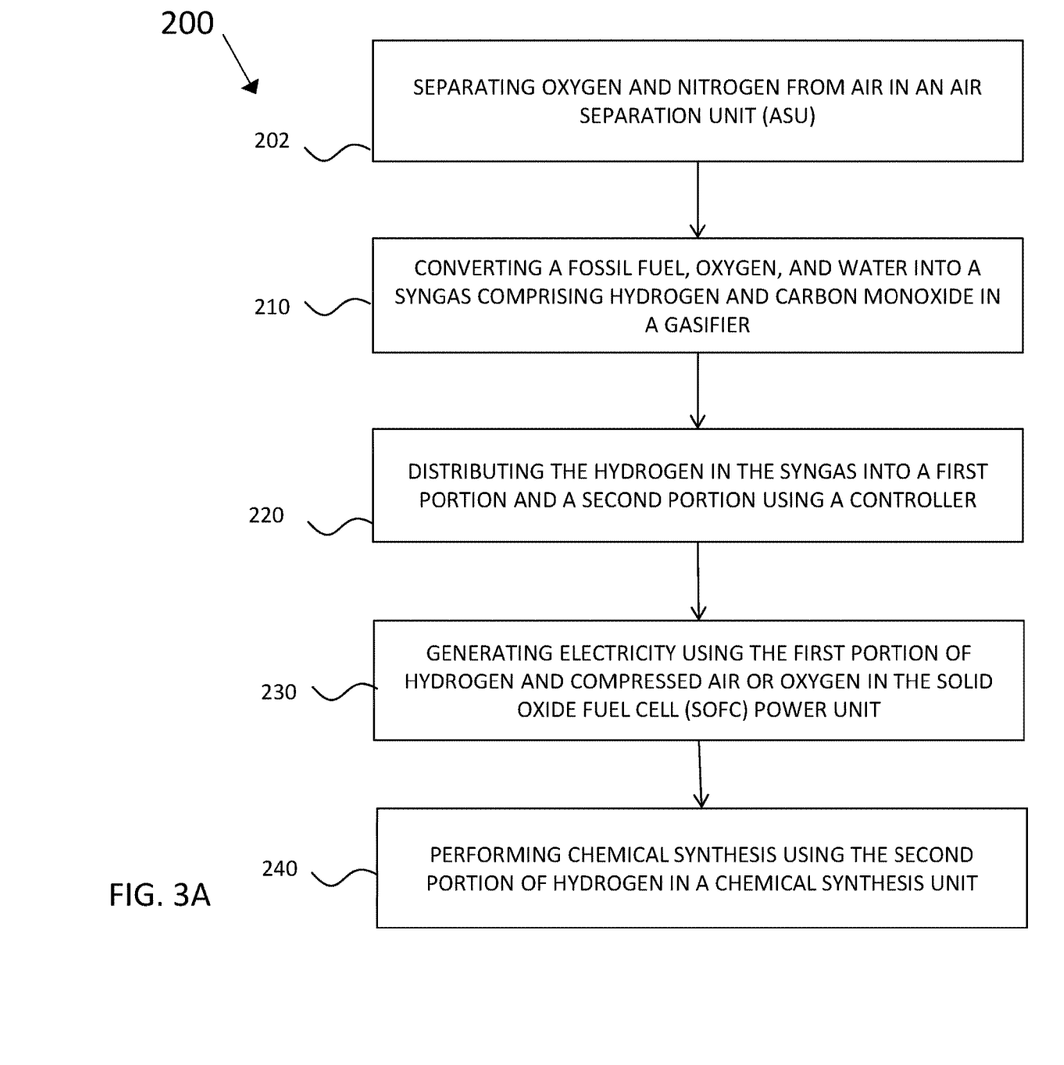
FIG. 3A-3B are a flow chart illustrating an exemplary method for producing electricity and/or chemicals in accordance with some embodiments.
Figure 3B:
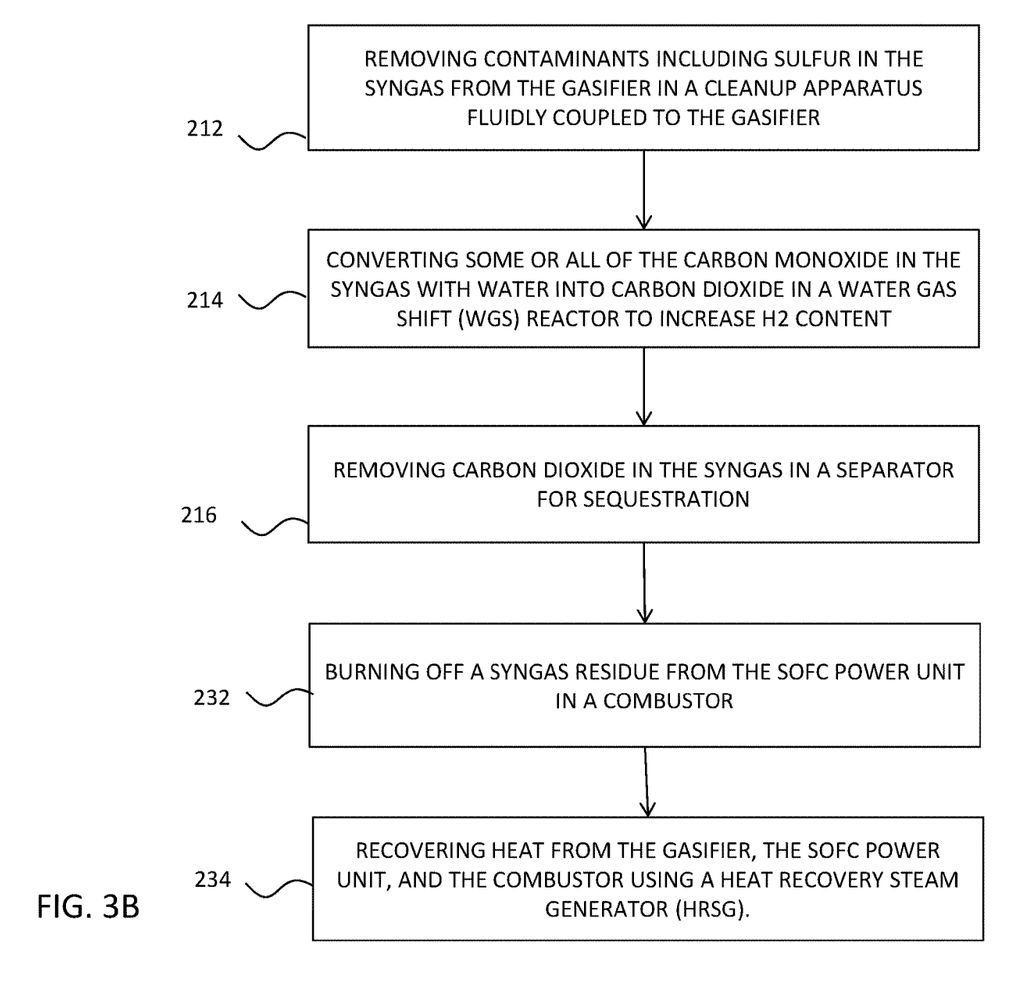

In FIGS. 1-2, like items are indicated by like reference numerals, and for brevity, descriptions of the structure, provided above with reference to the preceding figures, are not repeated. The methods described in FIGS. 3A-3B are described with reference to the exemplary structure described in FIGS. 1-2 and the data plots or sketches described in FIGS. 4-7.

Referring to FIG. 1, an exemplary system 100 comprises a gasifier 10, a controller 80, a solid oxide fuel cell (SOFC) power unit 90, and a chemical synthesis unit 110. The gasifier 10 is configured to receive and convert a fossil fuel.

The fossil fuel may be any suitable fuel, including but not limited to coal, oil, and natural gas. In some embodiments, the fossil fuel is coal.

In some embodiments, the system 100 further comprises an air separation unit (ASU) 20, which is fluidly coupled with both the gasifier 10 and the chemical synthesis unit 110. The ASU 20 is configured to separate oxygen and nitrogen from air, provide the oxygen into the gasifier 10, and provide the nitrogen to the chemical synthesis unit 110. A cryogenic ASU may be used in some embodiments. The ASU 20 may be configured to generate separate pure oxygen and nitrogen having a purity of 99% or above. Other gases such as argon may be also separated in some embodiments.

The gasifier 10 is configured to convert the fossil fuel such as coal, and oxygen and water into a syngas 13 comprising hydrogen and carbon monoxide. Syngas 13 may also comprise carbon dioxide.

In some embodiments, coal is used. Coal is used in a suitable form such as powder or a slurry of ground coal with water. Coal gasification processes provide for the conversion of coal to a gaseous product by reaction with heated air, oxygen, steam, or mixtures. The product of coal gasification is a syngas 13, which is mainly a mixture containing hydrogen and carbon monoxide. The syngas 13 exiting the gasifier may include varying amounts of other substances such as carbon dioxide, steam, hydrogen sulfide, organic sulfur compounds, tar, and small amounts of other contaminants. Most of the coal ash is removed from the gasifier 10 as slag or bottom ash.

In some embodiments, the system 100 further comprises a cleanup apparatus 30 fluidly coupled to the gasifier 10. The cleanup apparatus 30 is configured to remove sulfur and other contaminants in the syngas 13 from the gasifier 10.

In some embodiments, a warm gas desulfurization (WDP) technology, for example, one developed by Research Triangle Institute (RTI) International of North Carolina, U.S., is used. Such technology uses a pressurized dual transport-bed reactor design and an attrition-resistant, high-capacity, regenerable solid sorbent. WDP is capable of removing up to 99.9 percent of the total sulfur contaminants directly from raw syngas at gasifier pressure and warm process temperature (250-650° C.). In some embodiments, an acid gas removal (AGR) process with sulfur capture efficiency of 99.5 percent or above is used. The total sulfur content in the syngas must be maintained at less than 100 parts per billion by volume (ppbv) to protect the critical fuel cell materials. Other trace amounts of contaminants such as mercury are also removed from the syngas.

An expander 40 may be coupled with the cleanup apparatus 30, and is configured to expand the syngas 13 to a suitable pressure range.

The system 100 may further comprise a water gas shift (WGS) reactor 50 configured to convert some or all of the carbon monoxide in the syngas with water or steam into carbon dioxide so as to increase the content of the hydrogen in the syngas. Thus the ratio of hydrogen gas to carbon dioxide increases. In the WSG reactor, the syngas 13 is passed through a multi-stage, fixed-bed reactor containing shift catalysts to convert CO and water into additional $H_2$ and carbon dioxide ($CO_2$) according to a water-gas shift (WGS) reaction: $CO+H_2O \leftrightarrow H_2+CO_2$. The shift reaction may be performed at a suitable temperature in a range of from 200° C. to 500° C. Water steam providing high moisture content may be used.

A separator 60 is fluidly coupled to the WGS reactor 50. The separator 60 is configured to remove carbon dioxide in the syngas 13 for sequestration. Carbon dioxide can be separated using a membrane or a solvent. The removed carbon dioxide is captured and sequestrated. Carbon dioxide can be sequestered by being pumped underground for storage.

The controller 80 is configured to control distribution of the hydrogen in the syngas 13 into a first portion 15 and a second portion 17. As shown in FIG. 1, the controller 80 may be coupled with the separator 60.

The solid oxide fuel cell (SOFC) power unit 90 is configured to receive the first portion of hydrogen 15. A compressor 92 is fluidly coupled with the SOFC power unit 90 and is configured to compress air or oxygen and supply them into the SOFC power unit 90. The power unit 90 is configured to utilized the first portion of hydrogen 15 and the compressed air or oxygen, and generate electricity using the first portion of hydrogen 15 and the compressed air or oxygen. The first portion of hydrogen 15 may include carbon monoxide in some embodiments. The hydrogen and carbon monoxide are converted into water and carbon dioxide in the fuel cells.

The chemical synthesis unit 110 is configured to receive the second portion of hydrogen 17 and perform a chemical synthesis using the second portion of hydrogen 17. In some embodiments, the chemical synthesis unit 110 is configured to produce ammonia using hydrogen and nitrogen. In some other embodiments, the nitrogen and hydrogen can be captured separately as separate products in a compressed or liquid form. The second portion of hydrogen 17 may be also used for chemical synthesis of other chemicals.

The system 100 may also comprise a combustor 96 coupled to the SOFC power unit. The combustor 96 is oxy-combustor in some embodiments. With oxygen, the combustor 96 is configured to burn off a syngas residue including hydrogen or a mixture of hydrogen and carbon monoxide from the SOFC power unit 90.

In an integrated gasification combined cycle (IGCC) power plant, a gas turbine power island is used. In the IGFC power plant, a solid oxide fuel cell (SOFC) power unit is used instead. The SOFC provides for high electric efficiencies associated with the nearly reversible electrochemical conversion of syngas chemical potential to electric power. In addition, the clean oxy-reaction of syngas in the sealed fuel cell system renders itself readily available with only a small combustor downstream. The fuel that is not utilized electrochemically is less than 10% of the first portion of hydrogen.

A solid oxide fuel cell (SOFC) is an electrochemical conversion device that produces electricity directly from oxidizing a fuel. The SOFC has a solid oxide or ceramic materials as electrolytes. The solid oxide electrolyte can conduct negative oxygen ions from the cathode to the anode, or conduct protons through the electrolytes. The SOFC unit 90 includes separated anode and cathode, and may be a pressured unit or a unit configured to run at atmospheric pressure. The electrochemical oxidation of the hydrogen, and carbon monoxide or other organic intermediates by oxygen ions thus occurs on the anode side. The SOFC power unit 90 may be operated at a suitable temperature, for example, in a range between 500° C. and 1,000° C. Additional water vapor may be introduced into the SOFC power unit 90 when a small amount of carbon monoxide is also introduced into SOFC power unit. The SOFC power unit 90 may also include DC-AC inverters.

The system 100 may also comprise a heat recovery steam generator (HRSG) 70, which is configured to use heat recovered from the gasifier 10, the SOFC power unit 90, the combustor 96, and other units such as the cleanup apparatus 30. As shown in FIG. 1, additional expander 42, 46 and heat recovery units 72 and 76 may be used between the SOFC power unit 90 and the HRSG 70, and between the combustor 96 and the HRSG 70.

In some embodiments, heat is recovered from cooling raw syngas from the gasifier 10 and cleanup apparatus 30, the hot combustor exhaust gas from the combustor 96, and the hot vitiated air-exhaust gas from the SOFC unit 90 along with any process heat generated during syngas cleaning and sulfur extraction. The recovered heat is sent to the HRSG 70. The HRSG 70, in addition to meeting all the process steam requirements of the system 100, supplies steam to a cycling system. In some embodiments, the generated steam is used to make additional electrical power. The air separation unit (ASU) 20 supplies oxygen to the gasifier 10, and other units such as the combustor 96.

In some embodiments, the desired end-product in the chemical synthesis unit 110 is ammonia. Hydrogen of the second portion 17 is catalytically reacted with nitrogen from the ASU 20 to form anhydrous liquid ammonia through a reaction: $3H_2+N_2 \rightarrow 2NH_3$. Due to the nature of the magnetite) catalyst used in the ammonia synthesis reaction, only very low levels of oxygen-containing (especially CO, $CO_2$ and $H_2O$) compounds can be tolerated in the synthesis (hydrogen and nitrogen mixture) gas. Relatively pure nitrogen can be obtained by air separation. Additional purification and removal of carbon monoxide from the second portion of hydrogen 17 may be required.

Referring to FIG. 2, an exemplary controller 80 is illustrated. The controller 80 comprises one or more processor 82 and at least one tangible, non-transitory machine readable medium encoded with one or more programs 83, for controlling hydrogen supply for electricity and/or chemical production in accordance with some embodiments.

The controller 80 with the programs 83 and the processor 82 are configured to perform steps as described herein. The system 100 may also include one or two valves 84, 86, which receive the syngas comprising hydrogen from the separator 60. The valves 84, 86 may be located inside or outside the controller 80. The controller 80 is electronically and/or physically connected with the valves 84, 86 (represented in dotted lines) and communicate with and control the valves 84, 86. The valve 86 is configured to provide and control the first portion of hydrogen 15 supplied to the SOFC power unit 90. The valve 84 is configured to provide and control the second portion of hydrogen 17 supplied to the chemical synthesis unit 110. The controller 80 is configured to provide instructions to the valves 84, 86 and adjust the ratio of the first portion to the second portion of hydrogen 15, 17.

The processors 82 may be optionally connected with one or more displays 88 for displaying the information and instructions from processor 82 and to an operator. An input terminal 85 such as a keyboard may be also connected with the processor 82 for an operator to input information required to the controller.

The controller 80 with the processor 82 and one or more programs 83 are used to adjust the ratio of the first portion 15 to the second portion 17 of hydrogen. In some embodiments, the controller 80 is configured to adjust such a ratio based on a grid baseload, a percent load of the SOFC power unit 90, and/or a pre-determined minimum amount of the second portion of hydrogen as a baseline for keeping the chemical synthesis unit running. For example, in some embodiments, the ratio of the first portion to the second portion of hydrogen is controlled based on a grid baseload and a percent load of the SOFC power unit. In some embodiments, the ratio of the first portion to the second portion of hydrogen is controlled based on a grid baseload and a percent load of the SOFC power unit, while at least a pre-determined minimum amount of the second portion of hydrogen is distributed for keeping the chemical synthesis unit running continuously.

FIG. 3A is a flow chart illustrating an exemplary method 200 producing electricity and/or chemicals in accordance with some embodiments. Some supplemental steps in the method are illustrated in FIG. 3B. The steps are also described above in the system 100.

Referring to FIG. 3, at step 202, oxygen and nitrogen can be separated from air in an air separation unit (ASU), while the oxygen is provided into the gasifier 10, and the nitrogen is provided to the chemical synthesis unit 110.

At step 210, a fossil fuel is mixed with oxygen and water (or steam) and converted into a syngas comprising hydrogen and carbon monoxide in a gasifier 10 as described above. The syngas may also contain carbon dioxide and other ingredients as described above.

At step 220, the hydrogen in the syngas can be split or distributed into a first portion 15 and a second portion 17 using a controller 80.

At step 230, electricity is generated using the first portion of hydrogen 15 and compressed air or oxygen in the solid oxide fuel cell (SOFC) power unit 90.

At step 240, chemical synthesis is performed using the second portion of hydrogen 17 in a chemical synthesis unit. In some embodiments, the fossil fuel is coal. Ammonia is produced in the chemical synthesis unit 110. In some other embodiments, the nitrogen and hydrogen can be captured separately as separate products in a compressed or liquid form. Hydrogen can be the final product, or is used for synthesis of chemicals other than ammonia.

Referring to FIG. 3B, the method 200 may also further comprise other steps as described in the system 100. For example, these steps may include steps 212, 214, 216, 232, and 234. One or more of these additional steps may be used. Steps 212, 214, and 216 may be performed between step 210 and step 220. Steps 232 and 234 may be performed after step 230.

At step 212, contaminants including sulfur in the syngas may be removed from the gasifier 10 are removed in a cleanup apparatus 30 fluidly coupled to the gasifier 10.

At step 214, some or all of the carbon monoxide in the syngas may react with water and is converted into carbon dioxide in a water gas shift (WGS) reactor 50 so as to increase the content of the hydrogen or the ratio of hydrogen to carbon dioxide in the syngas.

At step 216, carbon dioxide in the syngas can be removed in a separator 60. The removed carbon dioxide is for sequestration.

At step 232, a syngas residue venting from the SOFC power unit 90 is burned off in a combustor 96.

At step 234, heat from the gasifier 10, the SOFC power unit 90, the combustor 96, and other apparatus such as the cleanup apparatus 30 can be recovered, and then used in one heat recovery steam generator (HRSG) 70 for generating steam. Step 234 may include multiple steps.

Using the system and the method provided in the present disclosure, the capability of producing electrical power and chemicals can be adjusted and balanced based on the electricity demand, or technical requirements. When the electricity demand is low, hydrogen produced is sent to chemicals production, for example, for ammonia synthesis. When electricity demand is high, the hydrogen is used in the SOFC power unit 90 to produce power. Additionally, the $N_2$ by-product produced from the ASU 20 is used to produce ammonia.

In some embodiments, the ratio of the first portion 15 to the second portion 17 of hydrogen is controlled by controller 80. The controller 80 comprises one or more processor 82 and at least one tangible, non-transitory machine readable medium encoded with one or more programs 83 configured to perform the function, for example, adjusting the ratio of the first portion to the second portion of hydrogen.

In some embodiments, the ratio of the first portion 15 to the second portion 17 of hydrogen is adjusted based on a grid baseload and a percent load of the SOFC power unit 90 at a time. The baseload, or called base load, on a grid is the minimum level of demand on an electrical grid over a span of time, for example, one week. Such a grid corresponds to the SOFC power unit 90. The baseload is a threshold. A plant load is the percent load of the power unit at a time point.

Figure 4:
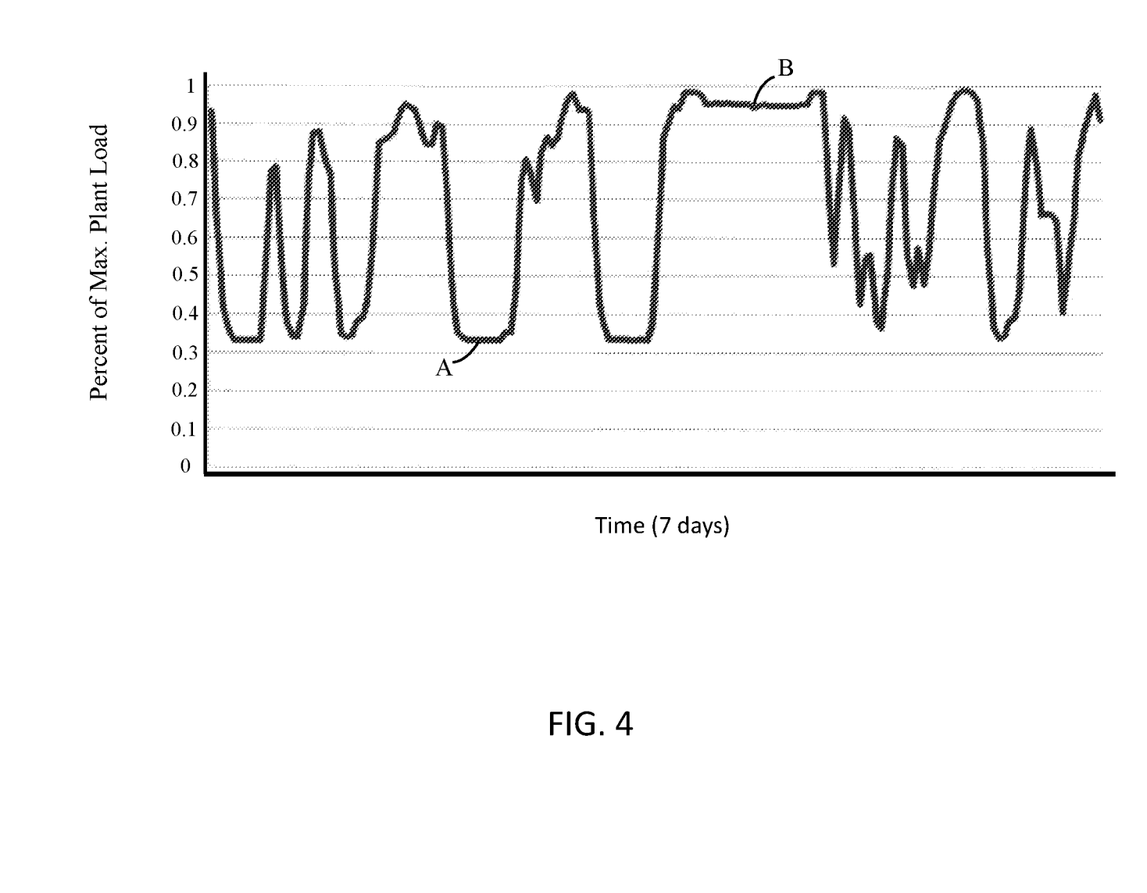
FIG. 4 is an exemplary curve illustrating variation in the percent load of an exemplary coal power plant within a period of time, for example, one week in some embodiments.

Referring to FIG. 4, an exemplary curve illustrates variation in the percent load of an exemplary coal power plant within a period of time, for example, one week in some embodiments. The relatively flat segment marked with "A" shows the minimum percent load of the coal power plant. The relatively flat segment marked with "B" shows a baseload (i.e. 0.95 or 95%) of the grid corresponding to the coal power plant. The percent load of the power plant may fluctuates with time, between the baseload and the minimum percent load, depending on the operation condition. Occasionally, the percent load may be higher than the baseload.

Figure 5:
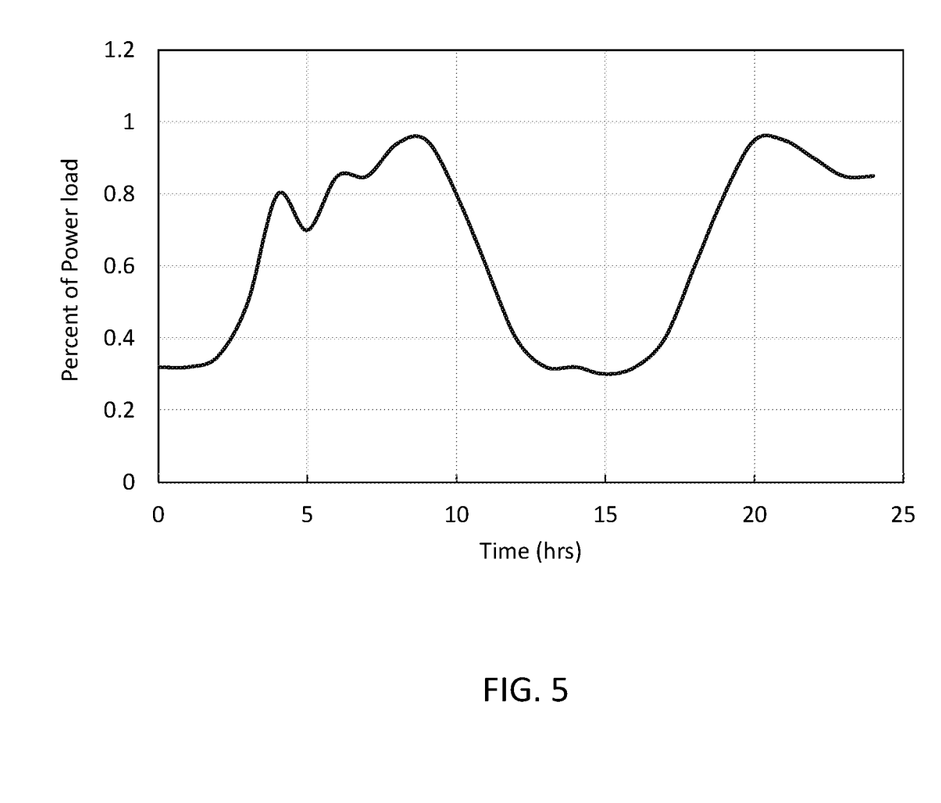
FIG. 5 is an exemplary curve illustrating variation in the percent load of an exemplary coal power plant within a period of time, for example, 24 hours, in some embodiments.

Referring to FIG. 5, similar to the curve in FIG. 4, an exemplary curve illustrates variation in the percent load of a coal-fired SOFC power unit 90 within a period of time, for example, 24 hours, in some embodiments. The highest load (0.95) is the baseload of the corresponding electrical grid.

Figure 6A:
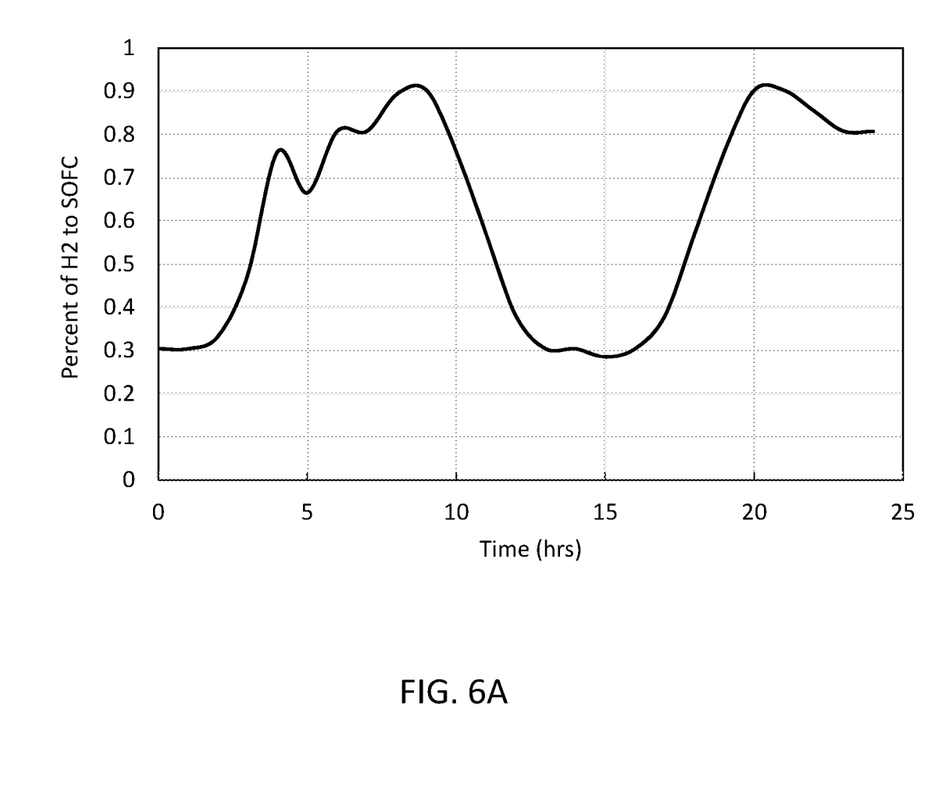
FIGS. 6A-6B illustrate a percentage of hydrogen distributed to a solid oxide fuel cell unit and a percentage of hydrogen distributed to a chemical synthesis unit, respectively, based on the variation in the percent load in FIG. 5 according to an exemplary controlling method in some embodiments.
Figure 6B:
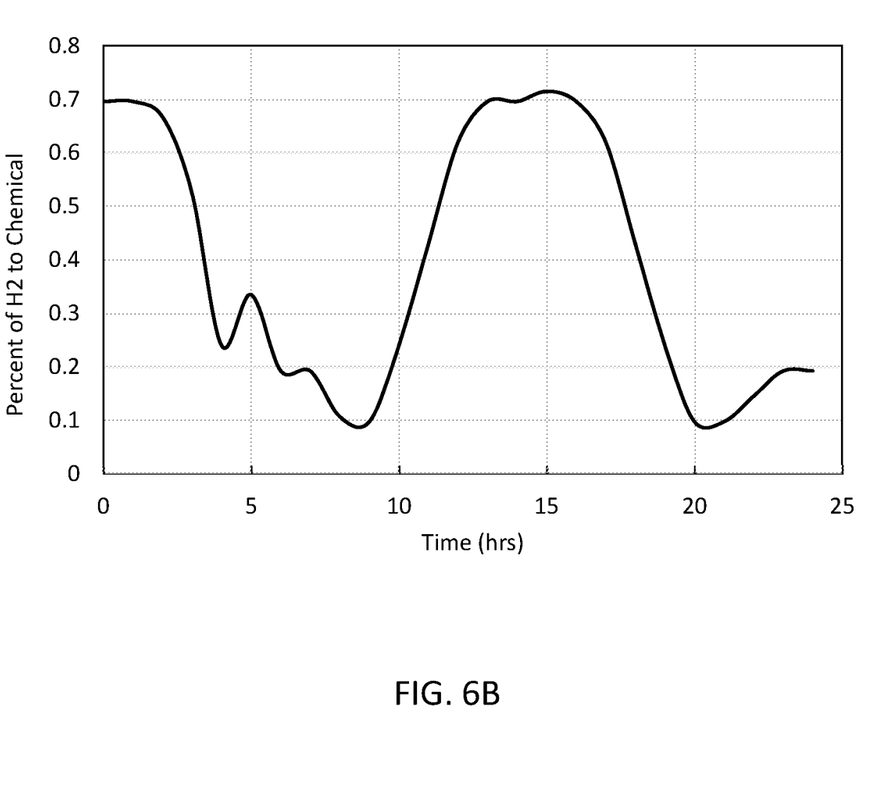

In some embodiments, a percentage of the first portion of hydrogen 15 is a product of the grid baseload and the percent load of the SOFC power unit 90. The remainder is a percentage of the second portion of hydrogen 17 among the first and the second portions of hydrogen. FIGS. 6A-6B illustrate a percentage of hydrogen distributed to a SOFC power unit 90 and a percentage of hydrogen distributed to a chemical synthesis unit 110, respectively, based on the data in FIG. 5.

For example, if the grid baseload is 0.95, and the percent load of the SOFC power unit 90 is 0.8 at a time point (e.g., at a time point of $4^{th}$ hour in FIG. 5), the percentage of the first portion of hydrogen 15 supplied for power production is 0.76 (i.e. 76%) as shown in FIG. 6A. 24% of the hydrogen is provided for hydrogen or ammonia production in the chemical synthesis unit 110.

Figure 7:
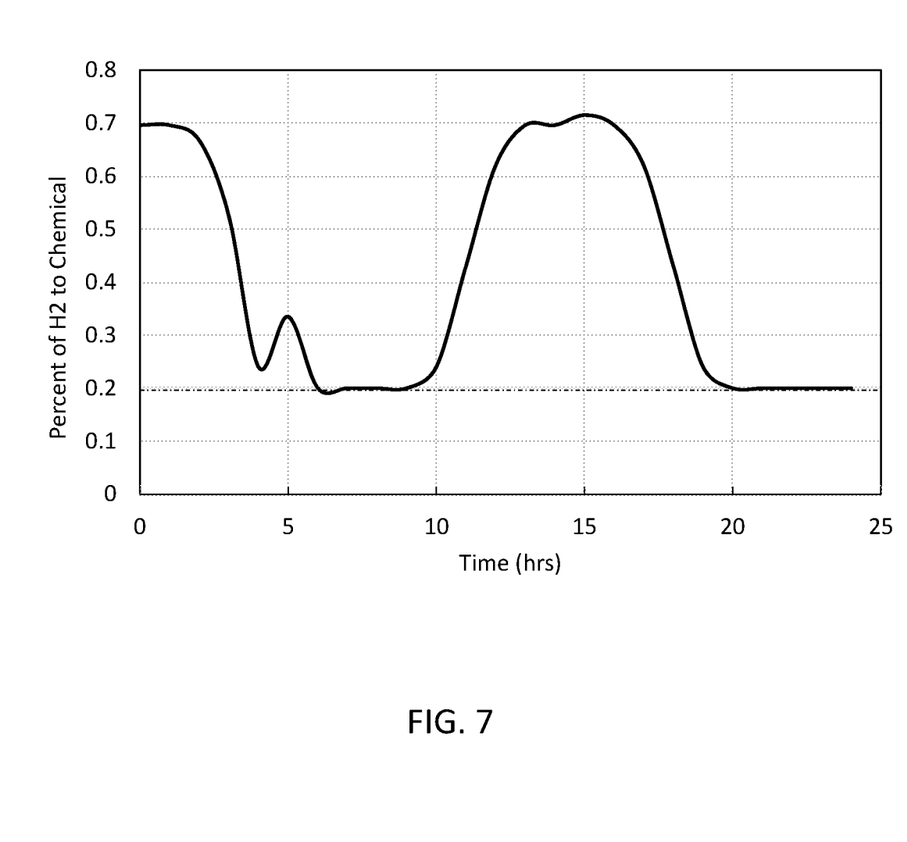
FIG. 7 illustrates a percentage of hydrogen distributed to the chemical synthesis unit based on the variation in the percent load of an exemplary coal power plant (or the grid baseload) of FIG. 5 according to an exemplary controlling method in some embodiments.

In some embodiments, at least a pre-determined minimum amount of the second portion of hydrogen is maintained for keeping the chemical synthesis unit running. The calculated percentage of hydrogen for chemical synthesis is illustrated in FIG. 7. The pre-determined minimum amount of the hydrogen for chemical production is about 20% (illustrated in the dotted line in FIG. 7). Above such a pre-determined amount, the percentage of the first portion of hydrogen for power production is the product of the grid baseload and the percent load of the SOFC power unit. When the calculated percentage of hydrogen for chemical production is 20% or lower, the percentage of hydrogen for power production is kept at 20%.

In some embodiments, the controller 80 provides the signal with instructions to one or more valves 84, 86 for controlling the hydrogen ratio. The controlling process may be performed manually or automatically. For the first portion of hydrogen 15 for power generation, it can be a mixture containing carbon monoxide (CO) in some embodiments. In addition to hydrogen, CO can be used as a starting material in solid oxide fuel cells. Or a small amount of CO can be tolerated. For the second portion of hydrogen 17 for chemical synthesis, an additional purification process may be used to remove any carbon monoxide or carbon dioxide residue and provide hydrogen having high purity into the chemical synthesis unit 110.

In some embodiments, the ratio of the first portion 15 to the second portion 17 of hydrogen may be also adjusted based on the demand. For example, when the price of the electrical power is higher than a certain pre-determined limit, more hydrogen may be shifted from chemical production to power production.

The ratio of the first portion 15 to the second portion 17 of hydrogen may be at any suitable range. For example, in some embodiments, the ratio of the first portion 15 to the second portion 17 of hydrogen may be also adjusted to be about 1:1.

The system, the controller, and the method provided in the present disclosure offer many advantages. For example, the system provides capabilities in producing both electrical power and/or chemicals, with flexibility in controlling the amount and the ratio based on the needs.

The methods and system described herein may be at least partially embodied in the form of computer-implemented processes and apparatus for practicing those processes. The disclosed methods may also be at least partially embodied in the form of tangible, non-transient machine readable storage media encoded with computer program code. The media may include, for example, RAMs, ROMs, CD-ROMs, DVD-ROMs, BD-ROMs, hard disk drives, flash memories, or any other non-transient machine-readable storage medium, or any combination of these mediums, wherein, when the computer program code is loaded into and executed by a computer, the computer becomes an apparatus for practicing the method. The methods may also be at least partially embodied in the form of a computer into which computer program code is loaded and/or executed, such that, the computer becomes an apparatus for practicing the methods. When implemented on a general-purpose processor, the computer program code segments configure the processor to create specific logic circuits. The methods may alternatively be at least partially embodied in a digital signal processor formed of application specific integrated circuits for performing the methods. The computer or the control unit may be operated remotely using a cloud based system.

Although the subject matter has been described in terms of exemplary embodiments, it is not limited thereto. Rather, the appended claims should be construed broadly, to include other variants and embodiments, which may be made by those skilled in the art.

What is claimed is:

1. A system, comprising:
a gasifier configured to convert a fossil fuel, oxygen, and water into a syngas comprising hydrogen and carbon monoxide;
a controller configured to control distribution of the hydrogen into a first portion and a second portion;
a solid oxide fuel cell (SOFC) power unit configured to receive the first portion of hydrogen and compressed air or oxygen, and generate electricity using the first portion of hydrogen; and
a chemical synthesis unit configured to receive the second portion of hydrogen and perform chemical synthesis using the second portion of hydrogen,
wherein the controller is configured to adjust the ratio of the first portion to the second portion of hydrogen based on a grid baseload and a percent load of the SOFC power unit,
wherein the controller comprises one or more processor and at least one tangible, non-transitory machine readable medium encoded with one or more programs configured to adjust a ratio of the first portion to the second portion of hydrogen,
wherein the ratio of the first portion to the second portion of hydrogen is controlled by the controller, and a percentage of the first portion of hydrogen is a product of the grid baseload and the percent load of the SOFC power unit.

2. The system of claim 1, wherein the fossil fuel is coal.

3. The system of claim 1, further comprising a cleanup apparatus fluidly coupled to the gasifier and configured to remove sulfur in the syngas from the gasifier.

4. The system of claim 1, further comprising a water gas shift (WGS) reactor configured to convert some or all of the carbon monoxide in the syngas with water into carbon dioxide so as to increase the content of the hydrogen in the syngas.

5. The system of claim 4, further comprising a separator fluidly coupled to the WGS reactor and configured to remove carbon dioxide in the syngas for sequestration.

6. The system of claim 1, further comprising an air separation unit (ASU) configured to separate oxygen and nitrogen from air, and provide the oxygen into the gasifier and provide the nitrogen to the chemical synthesis unit.

7. The system of claim 1, wherein the chemical synthesis unit is configured to produce ammonia.

8. The system of claim 1, further comprising a combustor coupled to the SOFC power unit and configured to burn off a syngas residue from the SOFC power unit, and a heat recovery steam generator (HRSG) configured to use heat recovered from the gasifier, the SOFC power unit, and the combustor.

* * * * *